Patented June 26, 1928.

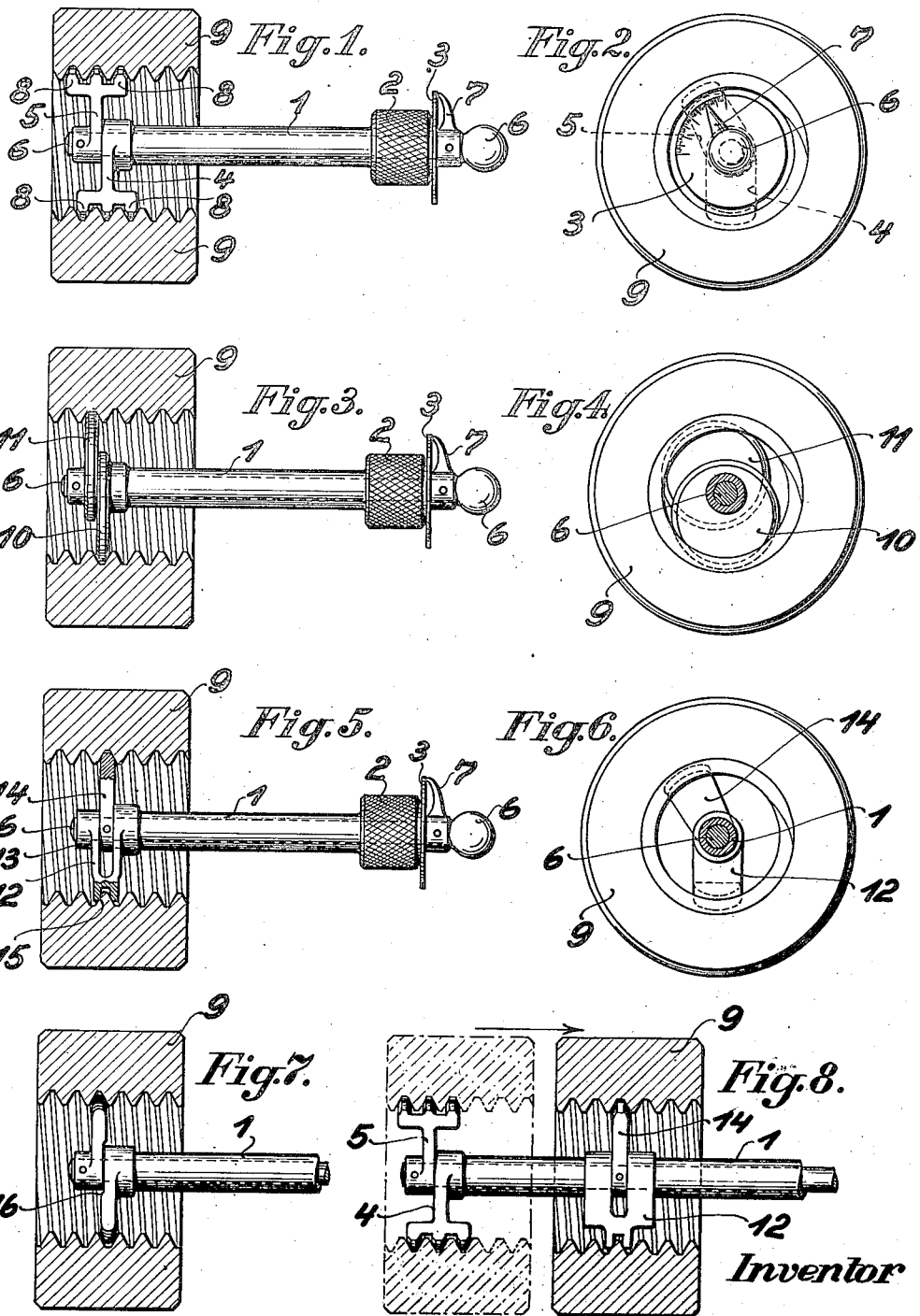

1,674,875

UNITED STATES PATENT OFFICE.

WERNER SCHAURTE, OF NEUSS, GERMANY.

SCREW GAUGE.

Application filed February 12, 1927, Serial No. 167,643, and in Germany February 12, 1926.

This invention has reference to screw gauges generally, and it relates more particularly to limit gauges for interior screw threads and it is one of the important objects of the invention to provide means for ascertaining whether or not the admissible limit or margin of deviations has been adhered to or not, or whether such limit has been exceeded or whether the thread remains too much below such limit, so that the gauge according to this invention will serve as a means for assorting the screws and determining whether they are in condition to be passed or rejected as waste. Among other important objects and advantages the device according to the invention is distinguished from the previous state of the art by its simple and stable construction, so that the device is particularly well adapted for the more or less rough handling in the workshop, and it is a further object of the subject matter of the invention to accelerate and facilitate the process of examination.

The essential feature of the invention resides in the arrangement of two eccentrically disposed discs or disc sections to be rotatably displaced with relation to each other, and which are disposed at right angles to their axis of rotation and provided with marginal thread engaging portions which are arranged in parallel relation to the pitch angle of the threads to be examined. These marginal disc portions are adapted to become engaged into or around the threads when the disks are relatively turned or rotated, while the amount of relative turning is indicated upon a graduated scale by a pointer or the like, from which the operator will be able to ascertain whether or not the admissible limit or margin of variations upwards or downwards has been adhered to.

The invention will be more fully and particularly described by reference to the accompanying drawing, showing by way of exemplification in Figure 1 a sectional view through a nut with the testing or gauging device for the good condition of the article with two adjacently disposed disc sections the marginal portions of which, as above outlined, are constructed in such a manner, as to be in accordance with the requirements for good-condition-gauges for threads, inasmuch as they will simultaneously gauge the pitch and the diameter of the flanks, so as to make sure that the gauged nut may be screw threadedly mounted upon a corresponding bolt.

Figure 2 of the drawing is a side view or plan view corresponding to Figure 1. Figures 3 to 7 are respectively sectional views and side elevations of embodiments of the principle of the invention, as applied to the examination of articles having defective threads. In Figure 8 another modification is shown, representing the combination of a gauge for the examination of the good-condition articles and articles having defective threads.

Upon a sleeve 1 (Figure 1) with handle 2 and graduated disc 3 attached thereto a disc section 4 is eccentrically mounted, while a second disc section 5 is keyed to a bolt or rod 6 guided in the sleeve and provided with a pointer 7, the section 5 being likewise eccentrically disposed on the bolt. The edges of the disc sections carry projections 8 adapted to become engaged between or around the screw threads of the threaded nut 9, and shaped in such a manner that they will test and gauge the pitch and the flank-diameters. The amount of turning of the disc sections required until engagement is effected is indicated by the pointer 7 upon the graduated disc 3. The said scale of divisions (Figure 2) has graduations for the exact theoretical measuring of the thread and for the still admissible deviations upwards and downwards for practical work, the so-called limit of allowable variations, and, if desired with subdivisions.

In Figures 3 and 4 a gauge is shown for testing threads found not absolutely perfect for the purpose of determining whether or not the deviations are within allowable limits. In this construction the disc sections are replaced by solid eccentrically disposed discs 10 and 11. The outer edges of the discs are bevelled off on both sides in accordance with the shape of the threads, by which means it becomes possible to make the two discs so narrow that they are adapted to become engaged at two oppositely disposed points of the thread differing for the value of half a pitch, the discs becoming thereby housed between the flanks of the thread. The indicating means are the same as described with reference to Figures 1 and 2.

In the modified construction according to Figures 5 and 6 the disc 10 is replaced by a disc section 12 constituting a fork which, while being rigidly secured to the sleeve 1, is, on the other hand, rotatably mounted on the bolt or rod 6 by means of a hub portion 13. Instead of the disc 11 a disc section 14 is keyed or otherwise rigidly secured to the rod 6 and may be rocked within the forked disc 12 by the rotation of the rod or bolt 6. The edge 15 of the forked disc 12 is likewise fork-shaped, so that it will not become situated between the flanks of the thread, but is adapted to embrace two adjacent flanks. The interior surfaces of the marginal forked portion are bevelled off to correspond with the flank faces.

In the modification according to Figure 7 the two disc sections have a round edge, in which case the marginal disc portion must be of greater thickness, and the discs are staggered at their hub-contacting surfaces so that the distance between their contacting surfaces, as measured by the distance between parallel transverse lines intersecting said surfaces, will not exceed one half of the height of a convolution of a thread.

In the modification according to Figure 8 a double gauge is shown, in which a gauge according to Figures 1 and 2 is combined with a gauge according to Figure 5. The nut 9 has been passed along the first-named gauge, and is now disposed on the second-named gauge. The forked disc 12 with its two hub portions is rigidly secured to the sleeve 1. The gauge 4, 5 may here be used to indicate whether or not the threads are perfect and if they are found imperfect the gauge 12, 14 may then be used to determine whether or not the imperfections are within permissible limits or the article should be rejected.

The various forms of embodiments of the principle of the invention herein shown and described should be understood as being merely illustrative exemplifications thereof, without limiting the invention to any particular form and arrangement of parts, but it should be understood that the invention may find expression in other embodiments and in other modifications, except as otherwise appears from the appended claims.

I claim:—

1. In a device of the kind described, concentrically disposed relatively rotatable rod and sleeve members, thread feeling and engaging members eccentrically mounted on said rod and sleeve members respectively, and means on said rod and sleeve members for indicating the relative angular rotation of said thread feeling and engaging members.

2. In a device of the kind described, concentrically disposed relatively rotatable rod and sleeve members, there being coacting graduations and indicating means at one end of said rod and sleeve members respectively, two adjacently disposed arms, fixedly mounted respectively at the other ends of the said rod and sleeve members, and screw-thread engaging and feeling means of a predetermined thread profile at the ends of said arms.

3. In a device of the kind described, concentrically disposed relatively rotatable rod and sleeve members, there being coacting graduations and indicating means at one end of said members respectively, two adjacently disposed arms, fixedly mounted respectively upon the other ends of the respective rod and sleeve members, and fork-shaped portions on said arms, adapted for the engagement and for the embracing of screw threads.

4. In a device of the kind described, concentrically disposed relatively rotatable rod and sleeve members, there being coacting graduations and indicating means respectively disposed at one end of said rod and sleeve members, two adjacently disposed arms, hub portions on said arms, staggeringly and mounted respectively upon the other ends of the rod and sleeve members, and marginal guide portions on said arms adapted for engagement with and the gauging of screw threads.

5. In a device of the kind described, concentrically disposed rod and sleeve members rotatable with relation to each other, there being coacting indicating means respectively disposed at one end of said rod and sleeve members, and two adjacently disposed arms respectively mounted at the other ends of the rod and sleeve members and having screw-thread engaging outer ends adapted for the simultaneous measuring of the pitch, the flank-diameter and the angle of said threads.

6. In a device of the kind described, concentrically disposed rod and sleeve members turnable with relation to each other, there being coacting indicating means respectively disposed at one end of said rod and sleeve members, two adjacently disposed arms respectively mounted at the other ends of the rod and sleeve members and in planes at right angles thereto, and thread engaging and gauging means of a predetermined thread profile at the free ends of said arms.

7. In a device of the kind described, concentrically disposed rod and sleeve members turnable with relation to each other, there being coacting indicating means respectively disposed at one end of said rod and sleeve members, two adjacently disposed arms respectively mounted at the other ends of the rod and sleeve members, and broadened, serrated, screw-thread engaging extensions at the outer ends of said arms for the gauging of the exactness of said screw-threads.

In testimony whereof I affix my signature.

WERNER SCHAURTE.